C. W. SKINNER.
IRRIGATING APPARATUS.
APPLICATION FILED FEB. 21, 1910.
1,104,839.
Patented July 28, 1914.
2 SHEETS—SHEET 2.
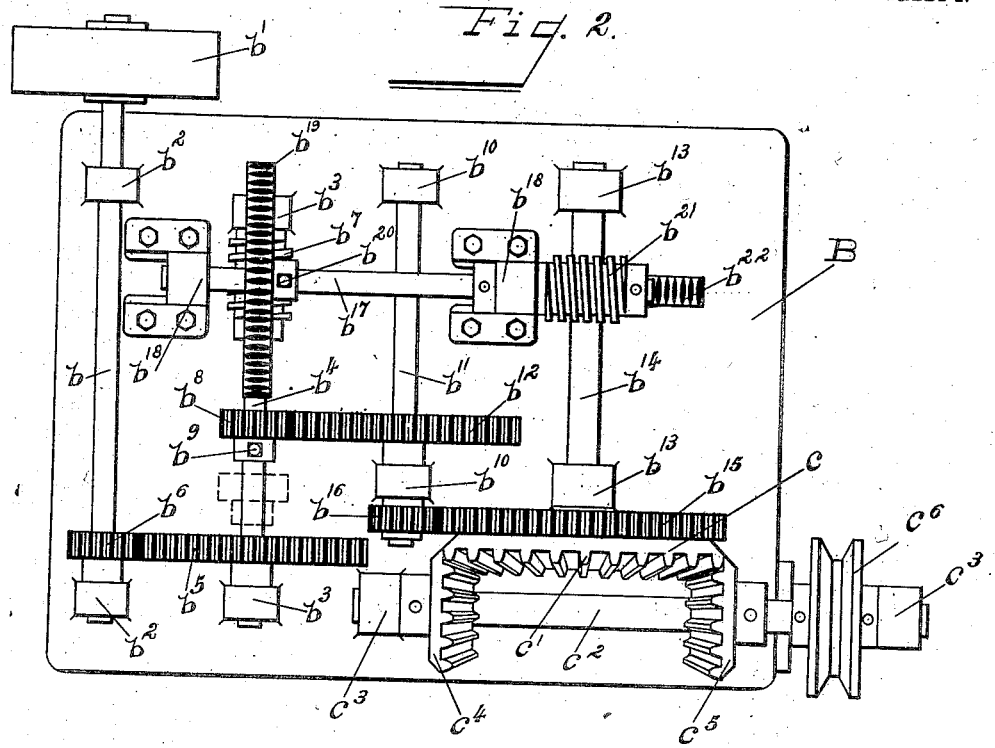
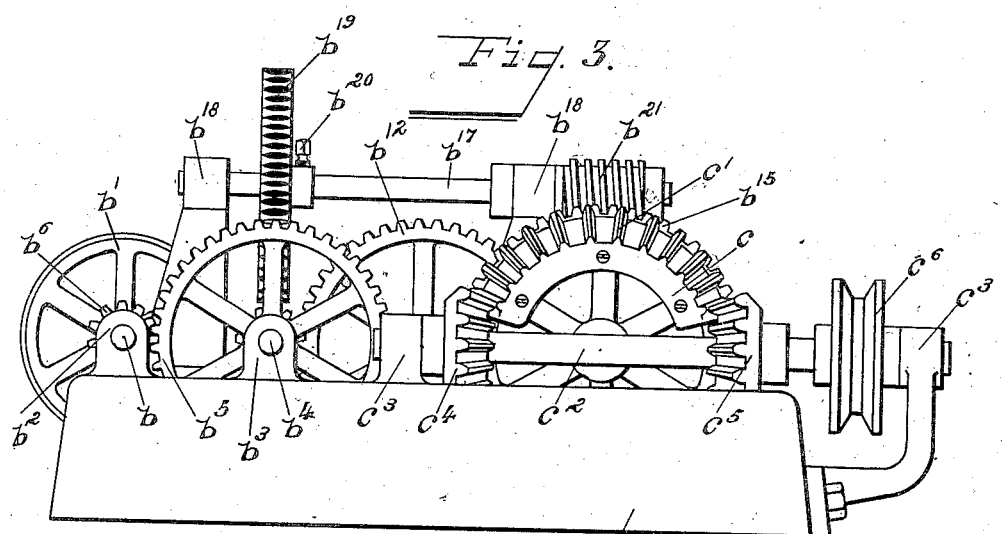

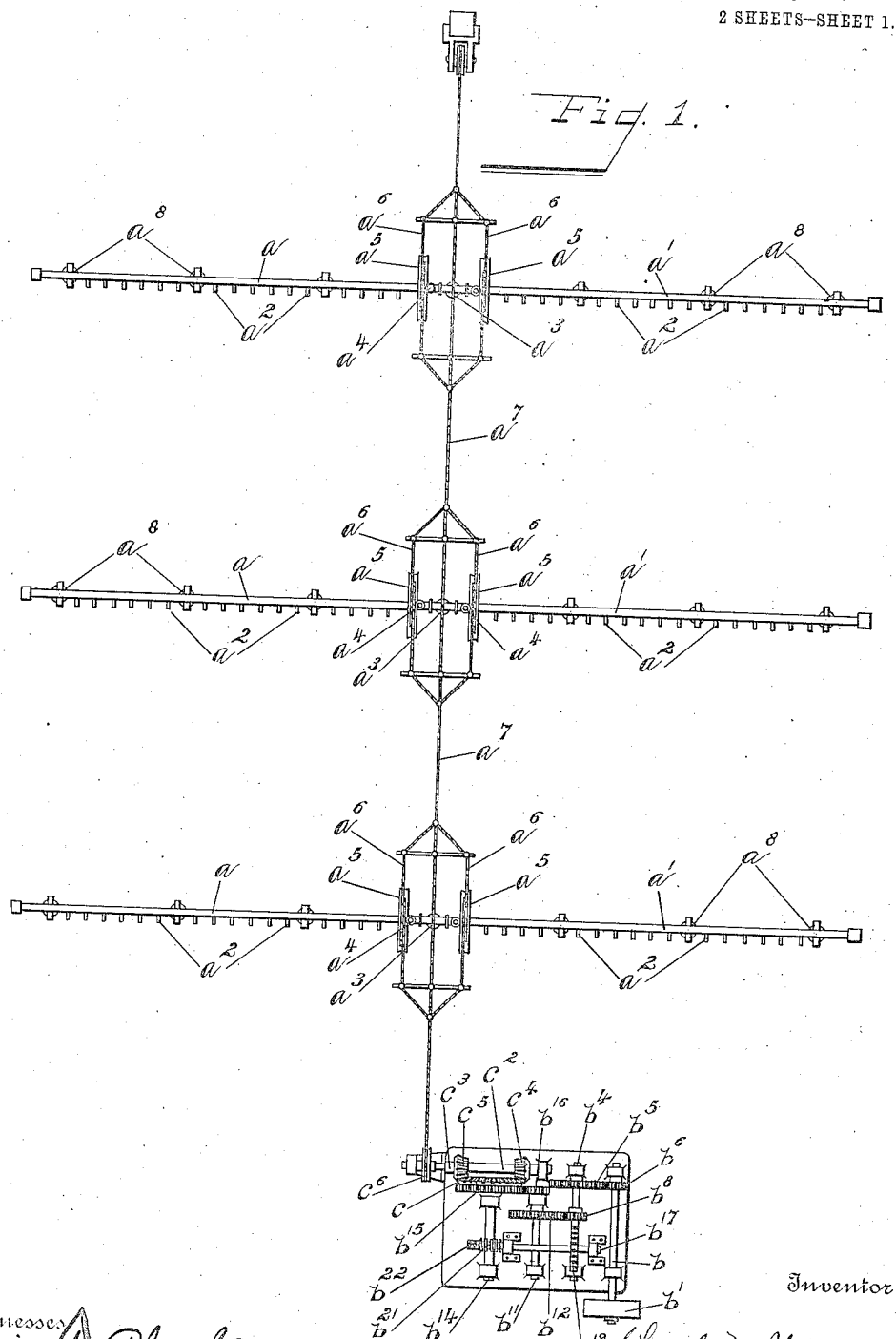

UNITED STATES PATENT OFFICE.

CHARLES W. SKINNER, OF TROY, OHIO, ASSIGNOR TO THE SKINNER IRRIGATION COMPANY, OF TROY, OHIO, A CORPORATION OF OHIO.

IRRIGATING APPARATUS.

1,104,839.  Specification of Letters Patent.  Patented July 28, 1914.

Application filed February 21, 1910. Serial No. 545,036.

*To all whom it may concern:*

Be it known that I, CHARLES W. SKINNER, a citizen of the United States, residing at Troy, in the county of Miami and State of Ohio, have invented certain new and useful Improvements in Irrigating Apparatus, of which the following is a specification.

This invention relates to improvements in apparatus for sprinkling growing plants, and it relates more particularly to devices for automatically changing the direction of the streams of water.

The object of the invention is to provide a sprinkling apparatus which will be simple in construction, capable of being easily and cheaply installed and which will be effective in its operation.

The invention consists in the constructions and combinations of parts hereinafter described and set forth in the claims.

In the accompanying drawings: Figure 1 is a top plan view of an apparatus embodying my invention. Fig. 2 is an enlarged top plan view of the turning device shown in Fig. 1. Fig. 3 is a side elevation of the same.

Like parts are represented by similar characters of reference in the several views.

In the installation of irrigation systems of the character to which this invention relates, it is usual to employ a series of parallel sprinkler pipes connected to a water supply, which pipes are provided with a series of nozzles throughout their length and are capable of being rotated so as to direct the water to different points. A very good example of a system to which this present invention has been applied is described and illustrated in my pending application, Ser. No. 517,316, filed September 11, 1909, and a brief description of which, with special reference to Fig. 1, is as follows: $a$ and $a'$ represent a series of sprinkler pipes, each of which is provided with a series of nozzles $a^2$ of any well-known construction; these pipes being supported upon the usual upright supports, $a^3$. Each of the pipes $a$ and $a'$ are rotatably connected to a water supply pipe, $a^3$, by a rotatable connection which comprises a projecting piece, $a^4$. To each of these pieces $a^4$ is secured a segment $a^5$, about which extends an auxiliary cable, $a^6$ connected to a continuous main cable, $a^7$, this main cable being extended over the entire series of pipes so as to connect them all together so that when the cable is moved all of the pipes will be rotated in unison, as fully described in my said application. In my said application referred to this cable was connected to a hand-turning device so that it required the attention of the operator to so manipulate the device as to direct the irrigating streams to the different points desired, which not only made the operation of such a plant more or less expensive but also caused to a great extent, an uneven distribution of the water. In the present device, instead of the hand-turning device, I employ a power operated mechanism capable of being automatically reversed so as to first turn the sprinkler pipes in one direction and then in the opposite direction; this mechanism being also so arranged as to provide for different speeds in the rotation of the pipes during the turning operation as will be more fully explained hereinafter. The mechanism forming this turning device is mounted upon a suitable base, B. Extending transversely across one end of the base is a driving shaft, $b$, which is continuously rotated from any suitable source of power, such as a gas engine, through the medium of the driving pulley $b'$ secured to one end of said shaft; this shaft being located in bearings, $b^2$ on said frame. Located in bearing $b^3$ on said frame and also extending transversely across the same, parallel with the shaft $b$ is a second shaft, $b^4$ which has secured thereto a gear $b^5$, meshing with the pinion $b^6$ on the shaft, $b$, so as to be continuously rotated from said shaft $b$. Secured to one end of the shaft $b^4$ is a worm, $b^7$ and also adjustably secured thereon is a pinion, $b^8$; the pinion $b^8$ being adapted to be secured to said shaft by the set-screw, $b^9$. Located in suitable bearings, $b^{10}$ on said frame and extending transversely across the same parallel to the shafts just described is a third shaft, $b^{11}$ which carries a gear $b^{12}$ adapted to mesh with the pinion, $b^8$ and to be driven thereby. Also extending transversely across the frame parallel to the shafts before described and located in suitable bearings, $b^{13}$ thereon is a fourth shaft $b^{14}$ which carries a gear $b^{15}$ meshing with a pinion $b^{16}$ secured to the shaft $b^{11}$. Extending longitudinally of the frame, above the respective shafts, $b^4$, $b^{11}$ and $b^{14}$, is a fifth shaft $b^{17}$, supported in suitable bearings, $b^{18}$ on said frame. This shaft $b^{17}$ has secured thereto at one end a worm gear, $b^{19}$, adapted to mesh with the worm, $b^7$ on the shaft $b^4$. This worm gear $b^{19}$ is adjustably secured to said shaft $b^{17}$ by a set-screw $b^{20}$ for the purpose hereinafter referred to. Secured to the other end of said shaft $b^{17}$ is a worm $b^{21}$ which meshes with a worm gear $b^{22}$ secured to the shaft $b^{14}$.

The result of the construction thus far described is that two different sets of driving mechanism are provided for the gear $b^{15}$, one being through the pinion $b^8$, gear $b^{12}$ and pinion, $b^{16}$, which is the high speed, and the other being through the worm $b^7$, worm gear $b^{19}$, worm $b^{21}$ and worm gear, $b^{22}$, which constitutes the low speed. When the low speed is in operation the pinion $b^8$ will be slid along its shaft to inoperative position as indicated in dotted lines in Fig. 2. When the high speed is in operation the worm gear $b^{19}$ will be moved along its shaft out of mesh with the worm $b^7$.

Secured to the gear $b^{15}$ is a beveled gear-segment $c$, the teeth $c'$ of which are arranged at varying distances apart, the distance between the teeth being gradually increased from the respective ends of the segment toward the center as shown in Fig. 3. Extending transversely of the frame in proximity to said gear segment is a shaft $c^2$, located in suitable bearings $c^3$ on said frame. This shaft $c^2$ carries two beveled pinions $c^4$ and $c^5$ adapted to mesh with the gear segment $c$. The other end of the shaft $c^2$ also carries a sheave or pulley $c^6$ about which passes the cable $a^7$ previously referred to. The construction of the gear segment $c$, and the pinions is such that as the gear segment leaves one of said pinions it will immediately engage with the other pinion and reverse the direction of rotation of the shafts $c^2$ and hence of the respective sprinkler pipes. By having the teeth of the gear segment $c$ further apart at the central portion, than the teeth at the respective ends of the segment, there will be more or less lost motion so that the speed of the shaft $c^2$ will be reduced. This reduces the speed of the rotation of the sprinkler pipes to the minimum at the time the nozzles are directing the streams of water in a vertical direction, gradually increasing the speed of the pipes as the same approach the limit of their movement on either side of the vertical line, thus causing a more even distribution of the water.

The proportion of the gearing is such that when the high speed is in operation the sprinkler pipes will be turned once, about every three minutes while when the low speed is in operation it will require about three hours for one turning of the pipes.

Having thus described my invention, I claim:

1. In an irrigating system, a plurality of sprinkler pipes, each of said pipes having a series of nozzles, a water supply connected with said pipes, means for oscillating said pipes simultaneously from a common point, and means for gradually increasing the speed of the oscillatory movement of said pipes from a vertical position of said nozzles, substantially as and for the purpose specified.

2. In an irrigating system, a plurality of sprinkler pipes, a series of nozzles connected with each of said pipes, a water supply also connected with said pipes, means for oscillating said pipes simultaneously from a common point, and means for gradually increasing the speed of the oscillatory movement of said pipes in either direction from a vertical position of said nozzles, substantially as specified.

3. In a system of irrigation, a plurality of sprinkler pipes, a series of nozzles connected with said pipes, a water supply for said pipes, power operated devices for oscillating said pipes simultaneously from a common point, means for changing the speed of said power operated devices, and means for gradually increasing the speed of the oscillatory movement of said pipes from a vertical position of said nozzles, substantially as specified.

4. In an irritating system, a series of sprinkler pipes, and an operating device for oscillating said pipes in unison, said operating device comprising a gear segment and two pinions adapted to be driven by said segment in opposite directions, the distance between the teeth of said segment being gradually increased from each end of the segment toward the center, substantially as and for the purpose specified.

In testimony whereof, I have hereunto set my hand this 5th day of February, 1910.

CHARLES W. SKINNER.

Witnesses:
 FLORENCE L. DE FREES,
 L. H. SHIPMAN.